(12) United States Patent
Cairnduff (10) Patent No.: US 8,645,104 B2
(45) Date of Patent: Feb. 4, 2014

(54) CORRECTION OF NON-UNIFORMITY OF RESPONSE IN SENSOR ARRAYS

(75) Inventor: Bruce Cairnduff, Cambridge (GB)

(73) Assignee: Thermoteknix Systems Limited, Waterbeach, Cambridge (GB)

( * ) Notice: Subject to any disclaimer, the term of this patent is extended or adjusted under 35 U.S.C. 154(b) by 1168 days.

(21) Appl. No.: 12/521,052

(22) PCT Filed: Dec. 21, 2007

(86) PCT No.: PCT/GB2007/004962
§ 371 (c)(1),
(2), (4) Date: Jul. 3, 2009

(87) PCT Pub. No.: WO2008/081165
PCT Pub. Date: Jul. 10, 2008

(65) Prior Publication Data
US 2010/0030506 A1   Feb. 4, 2010

(30) Foreign Application Priority Data

Dec. 28, 2006  (GB) .................................. 0625936.0

(51) Int. Cl.
*G06F 19/00*     (2011.01)
(52) U.S. Cl.
USPC .............................. 702/198; 702/85; 250/332
(58) Field of Classification Search
USPC .......................................... 382/274; 250/332
See application file for complete search history.

(56) References Cited

U.S. PATENT DOCUMENTS

| | | | |
|---|---|---|---|
| 2003/0006374 A1 | 1/2003 | McManus | |
| 2003/0198400 A1 | 10/2003 | Alderson et al. | |

FOREIGN PATENT DOCUMENTS

| | | |
|---|---|---|
| EP | 0717560 A1 | 6/1996 |
| EP | 1727359 A2 | 11/2006 |
| WO | 0171299 A2 | 9/2001 |

OTHER PUBLICATIONS

Minkshi Kumar, (Satellite Remote Sensing and GIS application in Agricultural Meteorology, pp. 1-3 and 81-102, Jul. 7-11, 2003).*
Nonuniformity Correction Research Group, Nov. 14, 2006, "htt;://nuc.die.udec.cl".

* cited by examiner

*Primary Examiner* — Jonathan C. Teixeira Moffat
*Assistant Examiner* — Hien Vo
(74) *Attorney, Agent, or Firm* — Barlow, Josephs & Holmes, Ltd.

(57) ABSTRACT

A microbolometer comprises an array of sensor elements or 'pixels' each individually responsive to generate an output indicative of the intensity of infrared radiation incident thereupon. In practice there are significant non-uniformities in the response of each pixel and further processing of the outputs must take place to generate an accurate image. These non-uniformities are dealt with by means of individual correction factors to be applied to the outputs of each pixel in the image. Commonly, the correction used provides a constant offset (1pt) and a linear gain correction (2pt). As the optimal values of these corrections drifts over time it is still necessary to provide further correction. In the present invention this is achieved by calculating one or more common scalar correction parameters that when applied to all of the individual correction factors before they are used to correct the output of the sensor elements will minimize the differences between the corrected outputs of adjacent sensor elements in the array when summed over a particular selection of sensor elements in the array.

24 Claims, 2 Drawing Sheets

Figure 1a – 1_pt Table

- 101: Stabilise array at temperature – T1
- 102: Surround array with uniform target also at T1
- 103: Capture Image - ICT1
- 104: Repeat steps 101 to 103 for temperatures throughout the camera's operating temperature range

Figure 1b – 2_pt Table

- 201: Expose array to target at low temperature T1
- 202: Capture Image – ITT1
- 203: Expose array to target at high temperature T2
- 204: Capture Image – ITT2
- 205: Create a 2pt difference map = ITT2 - ITT1

Figure 2 – Image Correction using 2 tables

CORRECTION OF NON-UNIFORMITY OF RESPONSE IN SENSOR ARRAYS

The present invention relates to the correction of non-uniformity of response of different elements within sensor arrays, and in particular to achieving this within a sensing array operable to capture an image such as an infrared image.

Infrared cameras measure infrared radiation (heat) incident upon a sensing array. Typically, the infrared radiation is directed to the sensing array via a lens such that an image of the intensity of infrared radiation emitted and/or reflected from objects in a scene can be obtained. Differences in the amount of infrared radiation produced/reflected from a particular position in the imaged scene will result in differences in the output of the relevant part of the sensing array. Conversely the sensing array should output a uniform response when it views a scene that produces/reflects a uniform amount of radiation.

Typically, the sensing array may be a microbolometer. A microbolometer comprises an array (grid) of pixels each individually responsive to infrared radiation. Each pixel consists of a thermally isolated "bridge" of resistive material that is heated by incident radiation. The resistance of the bridge varies with its temperature and this variation in resistance is used to generate an output related to the intensity of incident radiation. In practice these arrays are subject to a large amount of non-uniformity between pixels i.e. when exposed to the same amount of radiation each pixel produces a different response. The raw output from such arrays is dominated by this effect and is not recognisable as an image. As this is the case, infrared cameras apply a correction to the raw output of the array.

A known correction is to generate a table of individual correction factors to be applied to the outputs of each pixel in the image. Commonly, the correction used provides a constant offset (1pt) and a linear gain correction (2pt), wherein tables are stored by the camera containing the 1pt and 2pt factors to be used to correct the output of each individual pixel in the array. For each pixel the camera thus calculates a normalised output $O_N$, from a raw output $O_R$ of the form:

$$O_N = 2pt * O_R + 1pt$$

Typically the 1pt table is created (or adjusted) by imposing a paddle in front of the sensor to create a uniform illumination. The output for each pixel under these conditions is subtracted from the output when viewing the scene when the block is removed. The paddle may be a shutter, wherein the shutter is periodically used to block the incident radiation during use. In this manner the 1pt table can be regularly updated. This regular updating is necessary as the offset tends to drift over time. The drifting is particularly pronounced when the camera is used directly after being switched on but tends to stabilise to a large extent when the camera has been operated for a long period of time and the array approaches equilibrium. Typically, the shutter may need to be imposed on a second by second basis upon power up but after lengthy operation the interval between shutter impositions may be stretched to a minute or so before significant image degradation is apparent.

This method does however have a number of drawbacks namely: it obscures the image for a period of time; as a moving part, it is a reliability concern particularly with regards to vibration; it increases the power requirement for the camera (more problematically, it adds this additional requirement when the camera is operating at peak power); and it adds cost, weight and size to the camera.

The 2pt table is created by illuminating the array with two different uniform radiation intensities. The difference in the responses to the uniform intensities for each pixel is determined and used to calculate the 2pt value for each pixel. Unlike the 1pt table, there is no known easy way to create this table during normal operation of the camera, therefore, it is usually created and stored as a semi-permanent calibration.

Additional problems are encountered if the temperature of the sensing array varies, as the appropriate correction factors also vary with temperature. One way in which this problem is dealt with is by stabilising the array at the temperature of calibration. Typically this is achieved by the use of one or more Peltier devices. Whilst this provides a reasonably effective solution, incorporating one or more Peltier devices into the camera increases the cost of the camera. Furthermore, Peltier devices draw a considerable amount of power.

An alternative to stabilising the array temperature is to characterise the array performance at one or more temperatures and then to use dedicated sensors provided on the array, typically blind pixels, thermistors or similar, to measure the current array temperature. A temperature dependent interpolation can then be carried out to estimate a suitable adjustment to the correction factors. Due to the extreme sensitivity of the correction factors to array temperature, it is difficult to apply this technique sufficiently accurately to provide a clear image.

A further alternative method to deal with non-uniformity exploits the properties of a moving image and is not applicable to a static image. This relies upon the assumption that the mean incident radiation and the standard deviation of the incident radiation are substantially equal over the whole array area during a sufficient time interval. The offset correction can then be calculated from the mean value and the gain correction can be calculated from the standard deviation value. A variation on this technique submits the output of a pixel to a least mean square error calculation to reduce the effect of the offset non-uniformity.

Another alternative method of dealing with non-uniformity is disclosed in EP1727359. This document discloses a technique wherein a stored table of correction factors are scaled by a suitable scale factor and used to correct raw output data. The scale factor for the table is determined by a technique wherein a number of, typically three, different scale factors are applied to the tables, before the table is applied to the raw output data to generate three sets of corrected output data. Each set of corrected output data is then averaged over a plurality of adjacent pixels to generate a set of averaged corrected output data. The absolute magnitude of the differences between each pixel value in each corrected output data set and the corresponding averaged corrected output data set is determined and summed. The method then selects the scale factor which results in the lowest sum of differences between corrected and averaged corrected pixel output data. This process can be applied iteratively with the scale factors applied subsequently being determined by the determination of the previous best scale factor. This method works toward a solution by estimation rather than calculating an optimal scale factor. Additionally it requires the calculation of a moving average of corrected output data and as such requires a heavy processing load and results in a loss of detail. A further problem is that by comparing a corrected image with an averaged corrected image, the method is not directly determining how to deal with non-uniformity from the image itself.

It is therefore an object of the present invention to provide a method of correcting the output of a sensing array that alleviates or overcomes the above problems.

According to a first aspect of the present invention there is provided a method of calculating one or more common correction parameters for a set of individual correction factors for sensor elements in a sensor array by determining the one or more common correction parameters that when applied to all of the individual correction factors before they are used to correct the output of the sensor elements will minimise the differences between the corrected outputs of adjacent sensor elements in the array when summed over a particular selection of sensor elements in the array.

According to a second aspect of the present invention there is provided a method of correcting the output of a sensor array comprising: applying a correction factor to each element in the array, the correction factor comprising a one or more common correction parameters applied in the same manner to each of to a set of pre-determined individual correction factors, wherein the one or more common correction parameters are calculated according to the method of the first aspect of the present invention.

In the methods described above, the present invention utilises the general principle that adjacent sensing elements are likely to have similar inputs when considered over the array as a whole. As such, much of the output variation between adjacent sensing elements (i.e. the high spatial frequency output variation) can be assumed to result from the non-uniformity of response rather than from elements within the image. Furthermore the adjustment is calculated directly from image data and can be made concurrently with viewing the image. Accordingly, applying one or more common correction parameters to the individual correction factors in accordance with the present invention minimises the differences in corrected output between adjacent sensing elements resulting in the removal of much of the high spatial frequency variation and thus the non-uniformity of response. As the correction is based on applying a common correction parameter to a known set of individual correction factors and as the summing of differences is calculated directly with regard to the corrected outputs of adjacent sensor elements, the error involved and information discarded in making the correction is minimised.

The sets of individual correction factors may include either or both of an individual correction offset factor and an individual correction scale factor. The sets of individual correction factors may be stored in tables. The sets of individual correction factors may be 1pt and/or 2pt tables as known from the prior art.

The common correction parameter may be a scale factor applied to each individual correction factor. Alternatively, the common correction parameter may be an offset applied to each individual correction factor. In a preferred embodiment a compound common correction is applied to the individual correction factors. The compound correction may comprise both a scale factor and an offset.

Where both a scale factor and an offset are calculated, they may be independently calculated from the same output map of the array. This is because the effects that produce the non-uniformities in gain and the non-uniformities in offset are substantially independent of one another. In some such embodiments, a scale factor may be calculated and then the data corrected by the use of the scale factor may be used to calculate an offset, or vice versa.

The common scalar parameters may be calculated using any suitable method to minimise the differences between adjacent sensor elements. One suitable method is to calculate the common correction parameter that will minimise the sum of the squares of the differences between the corrected outputs of adjacent sensor elements.

In calculating the difference in corrected output between adjacent sensing elements, the outputs of one or more neighbouring sensing elements can be compared. Typically, since the method produces sufficiently impressive results using only adjacent pairs of neighbouring sensor elements, the additional processing load of using a two or more neighbouring sensor elements is not justified.

The sum of the squares of the differences in corrected output of adjacent sensor element pairs may be calculated over the whole array or over a selection of particular adjacent sensor element pairs. The selection may be based on location or may be based on a particular threshold. The threshold may be a preset value or may be varied so as to exclude a particular proportion of adjacent sensor element pairs. Preferably, the threshold is varied to so as to only take in to consideration a desired proportion, say 50%, of adjacent sensor element pairs that have the lowest differences in output.

The array may comprise any form of sensor elements. In some embodiments it may be an array of radiation sensing elements. In one particular embodiment, the array may be an array of infrared radiation sensing elements, such as a microbolometer.

In a preferred embodiment, the set of stored individual correction factors comprises a set of offset parameters calculated by imposing a uniform input to the sensor array. In a radiation sensing embodiment this may be achieved by exposing the array to uniform illumination. In preferred embodiments, there are two or more alternative sets of stored individual correction factors calculated in the above manner, taken at different array temperatures. Preferably, the temperatures chosen span substantially the full operating range of the sensor array. In the event of operation at a different temperature, the method may involve translation of an existing set of stored individual correction factors. Preferably, the translation is achieved by use of a scale factor. The scale factor may be calculated according to the method of the present invention.

By use of preinstalled sets of individual correction factors, the above method can be used in an infrared camera without a shutter. Alternatively, if the method is used in a camera incorporating a shutter, the shutter needs to be imposed much less often to maintain image quality. The above method also lends itself to use in an infrared camera without a Peltier device or other means to stabilise or directly monitor the temperature of the array. Accordingly infrared cameras operating according to the method of the present invention may use less power, be lighter, cheaper and have fewer moving parts than conventional infrared cameras.

The method may operate substantially continuously to optimise the one or more common correction parameters. This may involve using an uncorrected and/or a corrected array output as a basis for calculating the one or more common correction parameters for applying to the individual correction factors in a subsequent array output correction. In some embodiments, the common correction parameters for application in a subsequent correction may be calculated over a succession of prior outputs. In such cases each prior output may consider summed differences over the array as a whole or consider summed differences over a particular section of the array. In cases wherein particular sections are considered, preferably different sections are used in turn until the whole array output has been considered over a number of output cycles.

The value of any common correction parameter may be adapted such that the value of the individual offset correction factors when the common correction parameter is applied, averaged over the whole array, is substantially zero. This can minimise variation in overall output level in the corrected image as compared with the raw image.

The method may involve calculating common correction parameters for alternative sets of individual correction factors and then selecting the better set of individual correction factors (and common correction parameter) to use for array output correction. These alternative sets of individual correction factors may be sets of individual correction factors calculated at different array temperatures as described above. The better set of individual correction factors (and common correction parameter) for use may be selected by determining which set of individual correction factors (and common correction parameter) has the lower sum of the square of differences between adjacent sensor element pairs. The sum of the squares of the difference of adjacent sensor element pairs may be over the whole array or over a selection of particular adjacent sensor element pairs. The selection may be based on location or may be based on a particular threshold. The threshold may be a preset value or may be varied so as to exclude a particular proportion of adjacent sensor element pairs. Preferably, the threshold is varied to so as to only take in to consideration a desired proportion, say 50%, of adjacent sensor element pairs that have the lowest differences in output. In an infrared sensing system, this method can deal with variations in temperature of the array by allowing the selection of a better set of individual correction factors when array temperature varies.

In such cases, the method may include a hysteresis factor in determining whether to switch between sets of individual correction factors. The hysteresis factor may prevent switching between sets of individual correction factors unless there is a minimum variation in the sum of squared differences between two sets of individual correction factors. This increases image stability.

The method may involve using more than two sets of individual correction factors, each set of correction factors being provided with one or more common correction parameters. In such circumstances the selection of sensor element pairs may be based on a particular threshold. The threshold may be a preset value or may be varied so as to exclude a particular proportion of adjacent sensor element pairs. Preferably, the threshold is varied to so as to only take in to consideration a desired proportion, say 50%, of adjacent sensor element pairs that have the lowest differences in output. In such cases, the values of the outputs from rejected sensor element pairs may be substituted by the respective values of one of the sets of individual correction factors when calculating the scalar correction parameter that will minimise the sum of the squares of the differences in corrected outputs between adjacent sensor element pairs. This allows many terms involved in the calculation of the scalar correction parameters for each set of correction factors to be pre-computed reducing the processing load. In such circumstances, the calculation does not solve for the optimum common correction parameter factor value initially but will converge iteratively to the optimum value. This is satisfactory during normal ongoing operation. Upon initial start up, the threshold can be held arbitrarily large so that all sensor elements are included in the calculation. This allows the initial start up performance to be improved.

According to a third aspect of the present invention there is provided a sensor array and a processing unit connected thereto wherein the processing unit is operable in accordance with the above methods.

The sensor array and processing unit of the third aspect of the present invention may incorporate any or all features of the first two aspects of the present invention as desired or as appropriate.

The sensor array may comprise any form of sensor elements. In some embodiments it may be a sensor array of radiation sensing elements. In one particular embodiment, the sensor array may be an array of infrared radiation sensing elements, such as a microbolometer.

The sensor array may be provided on a single integrated circuit. The processing unit may be provided on the same integrated circuit as the sensing array or on a separate integrated circuit. The processing unit may be a digital signal processor (DSP), field-programmable gate array (FPGA) block or a dedicated application specific integrated circuit (ASIC).

The array may comprise any form of sensor elements. In some embodiments it may be an array of radiation sensing elements. In one particular embodiment, the array may be an array of infrared radiation sensing elements, such as a microbolometer.

According to a fourth aspect of the present invention there is provided an infrared camera incorporating a sensor array in accordance with the fourth aspect of the present invention.

The infrared camera of the fourth aspect of the present invention may incorporate any or all features of the first three aspects of the present invention as desired or as appropriate.

The camera may be provided with a shutter.

According to a fifth aspect of the present invention there is provided a radiometer incorporating a sensor array in accordance with the fourth aspect of the present invention.

The radiometer of the fifth aspect of the present invention may incorporate any or all features of the first three aspects of the present invention as desired or as appropriate.

The radiometer may be provided with a shutter.

In order that the invention can be more clearly understood principles and specific examples of implementation are now described further herein, by way of example only, and with reference to the accompanying drawings in which:—

FIG. 1$a$ is a flow diagram illustrating the process of generating a 1pt table for correction by the method of the present invention;

FIG. 1$b$ is a flow diagram illustrating the process of generating a 2pt table for correction by the method of the present invention;

A microbolometer comprises an array of sensor elements or 'pixels' each individually responsive to infrared radiation. Each pixel consists of a thermally isolated "bridge" of resistive material that is heated by incident radiation. The resistance of the bridge varies with its temperature and this variation in resistance is used to generate an output related to the intensity of incident radiation. In a perfect world, an image can be generated directly from the outputs of each pixel in the array. In practice however, there are significant non-uniformities in the response of each pixel and further processing of the outputs must take place to generate an accurate image.

Typically the most significant non-uniformities result from variations in the resistance (due to differences in the size/shape of the pixels) and light absorption (due to the dimensional variation in the pixel structure). The resistance variations also scale with array temperature. Given that both the resistance and light absorption effects are independent, corrections for each effect may be calculated from the same set of data.

As described above, in the prior art, these non-uniformities are dealt with by means of individual correction factors to be applied to the outputs of each pixel in the image. Commonly, the correction used provides a constant offset (1pt) and a linear gain correction (2pt). For each pixel the camera thus calculates a normalised output $O_N$, from a raw output $O_R$ of the form:

$$O_N=2pt*O_R+1pt$$

The $1_{pt}$ term is related to the non-uniformity of resistance and the 2pt term is related to the variation in absorption. As described above, in the prior art, a new 1pt table is created by imposing a shutter in front of the sensor to create a uniform illumination. The output for each pixel under these conditions is subtracted from the output when viewing the scene when the block is removed. In contrast, the 2pt table is generated as a semi-permanent calibration by exposing the array to illumination with two different uniform intensities, wherein the gain term is calculated from the difference of the output values.

Figures 1, 1A:
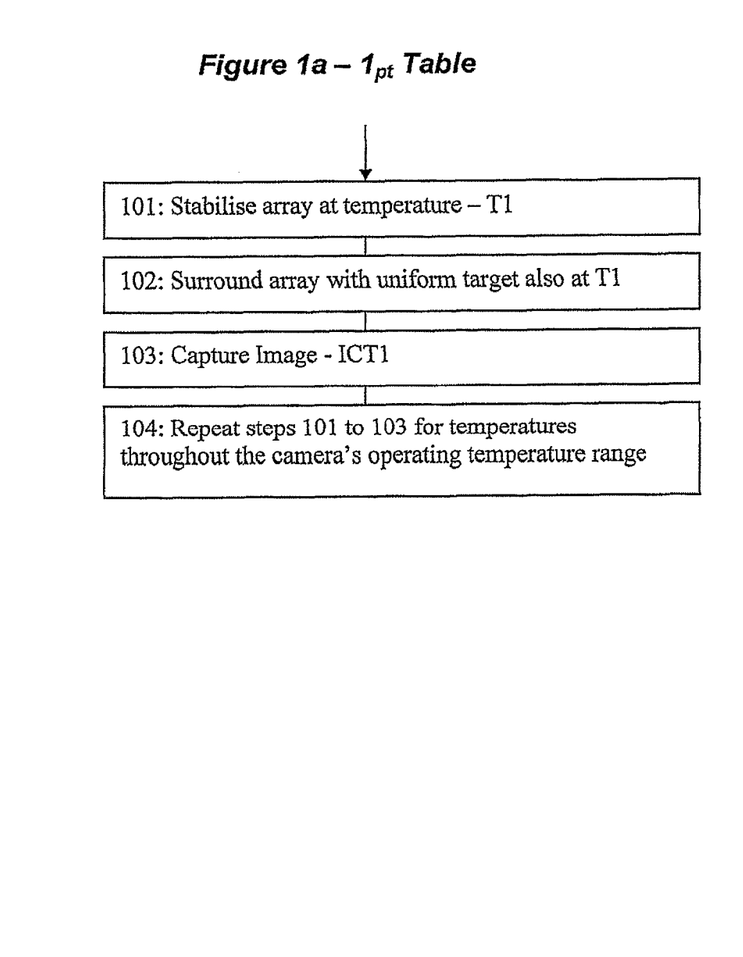

Turning now to FIG. 1a, in the present invention the array is exposed to uniform illumination at the same temperature as the array to generate a 1pt table as above. This involves stabilising the array at a low temperature within the operation range (T1), exposing the array to a uniform target also at T1 and capturing an image ICT1 as is shown in steps 101-103. This can be repeated as necessary at one or more higher temperatures (T2, ...) within the operating range to capture multiple different temperature images (ICT2, ...) at step 104. The temperatures used ideally represent substantially the full operating range of temperatures. As the pixel resistances are principally in a fixed ratio to one another, the primary change in the 1pt image with temperature is scalar. Thus a 1pt table can be constructed for an arbitrary temperature by scaling a stored 1pt table for a previously stored temperature, preferably close to the arbitrary temperature. This allows operation at temperatures where there is no prior stored 1pt table. As indicated, in the present invention, a scalar transformation or linear interpolation is used but the invention does not preclude the use of other more complex interpolations if required or desired.

The 1pt table is typically stored as a semi-permanent calibration. It is theoretically possible for a single temperature image to be used as the basis of the $1_{pt}$ table; however, in practice this does not provide good results. The practical alternative is to create and store a plurality of 1pt tables across the range of operating temperatures during calibration and select the closest 1pt table for use at any particular time.

Figures 1B, 2:
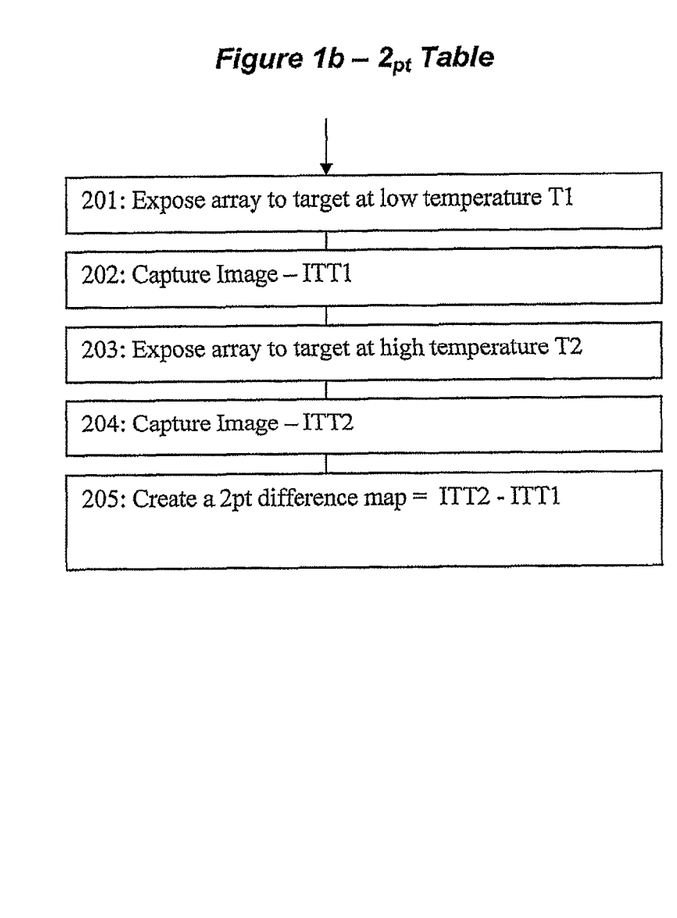
Figure 2:
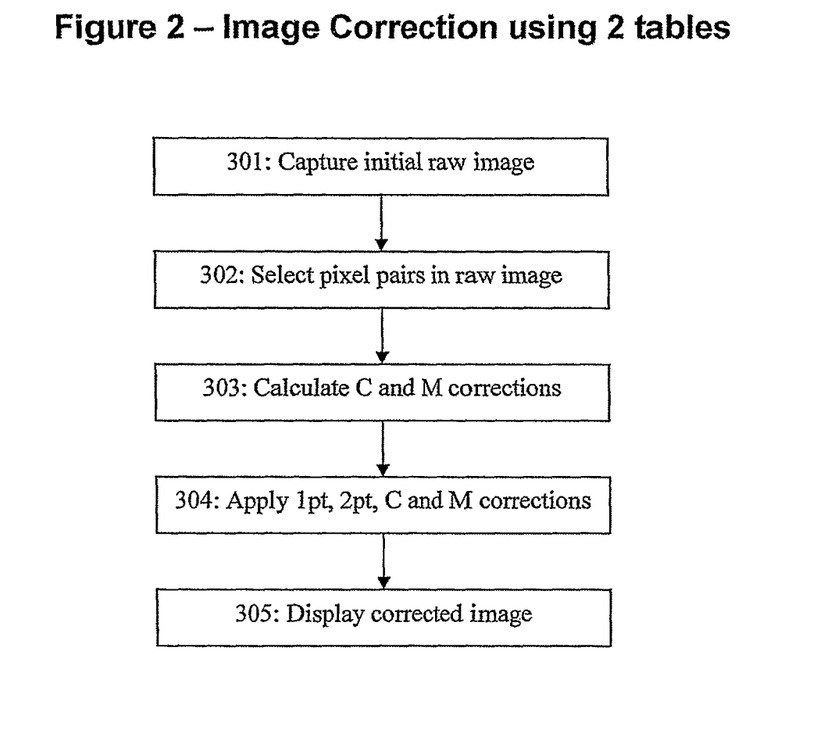
FIG. 2 is a flow diagram illustrating the process of correcting a captured image according to one implementation of the method of the present invention.

Turning now to FIG. 1b, the array is exposed to uniform targets at two different temperatures: a low temperature T1 and a high temperature T2. The temperatures T1 and T2 ideally represent substantially the full operating range of temperatures and may be the same temperatures used in generating the 1pt table. A pair of images ITT1 and ITT2 are captured, one at each temperature, as is shown in steps 201-204. The method then involves creating a difference map by subtraction of ITT1 from ITT2 to generate the 2pt table in step 205.

In use an image is captured using the array. A correction based on the 1pt table is to be applied to the outputs of the array. To deal with the instantaneous level of non-uniformity, the correction is itself corrected by applying a common correction parameter to each of the values in the 1pt table. In the present invention, a common correction parameter in the form of a scale factor is determined by calculating the scale factor that will minimise the sum of the differences between adjacent pixels in the array when summed over the full array.

Optionally, the method then further involves applying a further common correction based on the 2pt table wherein to deal with the instantaneous level of non-uniformity, the correction is itself corrected by applying a common correction parameter in the form of a scale factor to the 2pt table. Again, in the present invention, the scale factor for the 2pt table is also determined by calculating the scale factor that will minimise the sum of the differences between adjacent pixels in the array when summed over the full array. The resultant corrected image is then displayed.

Typically, the calculation of the scale factor that will minimise the sum of the differences between adjacent pixels in the array is achieved by a least mean squares calculation based on the sums of the differences between the outputs of adjacent pixels. This is illustrated in the example below wherein the raw output of pixels a and b are $O_a$ and $O_b$ and the 1pt tables for pixels a and b are $1pt_a$ and $1pt_b$. As such, the corrected output (including the scale factor S) for each pixel is determined by $O_a+S*1pt_a$ and $Ob+S*1pt_b$ respectively. Accordingly, to find S that minimises the difference of the squared outputs of a and b after the correction is applied, the following sum must be minimised:

$$((O_a+S*1pt_a)-(O_b+S*1pt_b))^2$$

Multiply out:

$$((O_a-O_b)+S*(1pt_a-1pt_b))^2$$

$$(O_a-O_b)^2+2*S*((O_a-O_b)*(1pt_a-1pt_b))+S^{2}*(1pt_a-1pt_b)^2$$

To minimise this differentiate by S and equate to 0:

$$0=2*(O_a-O_b)*(1pt_a-1pt_b)+2*S*(1pt_a-1pt_b)^2$$

From which:

$$S = \frac{(O_a - O_b)*(1pt_a - 1pt_b)}{(1pt_a - 1pt_b)^2}$$

This scale factor correction could be substituted directly for the 1pt table used in the prior art. Assuming that the 2pt table perfectly captures the gain variations of the individual pixels, the non-uniformity introduced by changing the absolute level of the 1pt table is a scalar of the 2pt table. Essentially, $$O_N=2pt*(O_R-1pt)$$

Change absolute level of 1pt by offset give new output O' where, $$O_N'=2pt*(O_R-1pt+\text{offset})$$

$$O_N'=2pt*(O_R-1pt)+2pt*\text{offset}$$

$$O_N'=O_N+2pt*\text{offset}$$

Output is changed by 2pt*offset, which is a scalar of the 2pt table. Accordingly, by running a least mean square calculation on the difference of the outputs of adjacent sensing elements of the above, a common offset parameter can be generated and also applied to the 1pt table to improve the image.

The method of the present invention has the benefit that it can be implemented on a camera without the need for a shutter or the need for a Peltier device to maintain the temperature of the array or a thermistor to monitor the temperature of the array. Accordingly, the camera can comprise fewer components meaning that it is lighter, consumes less power and is cheaper to manufacture. Additionally, the omission of the shutter reduces the number of moving parts thus enhancing the potential lifespan. A further benefit is that the array and the processing unit may be provided on a single integrated circuit, thus further reducing cost of manufacture.

In practical embodiments however, the shutter may be retained so as to provide a simple way to generate new 1pt tables periodically. Given the method of the present invention however, the time interval between successive uses of the shutter can be extended markedly as compared with the prior art.

A derivation of another implementation of the present invention is set out below. In this implementation, each individual factor in the 1pt table is adjusted by a common linear translation (scale factor (M) and offset (C)). The adjusted values in the adjusted 1pt table, A1pt, are given by:

$$A1pt_{i,j} = M * 1pt_{i,j} + C$$

where both M and C are constant across the whole table.

The adjusted 1pt table A1pt is then applied to the outputs $O_{Ri,j}$ of each array element to generate corrected outputs $O_{Ni,j}$ to create a corrected image. Thus:

$$O_{Ni,j} = (O_{Ri,j} - A1pt_{i,j}) * 2pt_{i,j}$$

So by substitution:

$$O_{Ni,j} = (O_{Ri,j} - M*1pt_{i,j} - C) * 2pt_{i,j}$$

The difference D between the outputs $O_{R1}$, $O_{R2}$ of two pixels $p_1$, $p_2$ is given by:

$$D = (O_{R1} - M*1pt_1 - C)*2pt_1 - (O_{R2} - M*1pt_2 - C)*2pt_2$$

Rearranging:

$$D = (O_{R1}*2pt_1 - O_{R2}*2pt_2) - M*(1pt_1*2pt_1 - 1pt_2*2pt_2) - C*(2pt_1 - 2pt_2)$$

For the sake of clarity, the following substitutions can be made:

$$\Delta P = (O_{R1}*2pt_1 - O_{R2}*2pt_2);$$

$$\Delta 1P = (1pt_1*2pt_1 - 1pt_2*2pt_2); \text{ and}$$

$$\Delta 2P = (2pt_1 - 2pt_2)$$

leaving:

$$D = \Delta P - M*\Delta 1P - C*\Delta 2P$$

The square of the difference D is:

$$D^2 = \Delta P^2 + M^2*\Delta 1P^2 + C^2*\Delta 2P^2 - 2*\Delta P*M*\Delta 1P - 2*\Delta P*C*\Delta 2P + 2*M*\Delta 1P*C*\Delta 2P$$

This derivation provides the difference value between the outputs of a pair of pixels. In order to solve for M and C we need to consider the accumulated square of the differences for all pixel pairs. This can be achieved for a population of pixels by summing each term over the whole population:

$$\Sigma D^2 = \Sigma(\Delta P^2) + M^2*\Sigma(\Delta 1P^2) + C^2*\Sigma(\Delta 2P^2) - 2*M*\Sigma(\Delta P*\Delta 1P) - 2*C*\Sigma(\Delta P*\Delta 2P) + 2*M*C*\Sigma(\Delta 1P*\Delta 2P)$$

To minimise on M differentiate with respect to M and set to zero:

$$0 = M*\Sigma(\Delta 1P^2) - \Sigma(\Delta P*\Delta 1P) + C*\Sigma(\Delta 1P*\Delta 2P)$$

To minimise on C differentiate with respect to C and set to zero:

$$0 = C*\Sigma(\Delta 2P^2) - \Sigma(\Delta P*\Delta 2P) + M*\Sigma(\Delta 1P*\Delta 2P)$$

Accordingly, one can now set up a pair of simultaneous equations that can be solved algebraically:

$$M = \frac{\Sigma(\Delta 2P^2)*\Sigma(\Delta P*\Delta 1P) - \Sigma(\Delta P*\Delta 2P)*\Sigma(\Delta 1P*\Delta 2P)}{\Sigma(\Delta 2P^2)*\Sigma(\Delta 1P^2) - \Sigma(\Delta 1P*\Delta 2P)*\Sigma(\Delta 1P*\Delta 2P)}$$

$$C = \frac{\Sigma(\Delta 1P^2)*\Sigma(\Delta P*\Delta 2P) - \Sigma(\Delta P*\Delta 1P)*\Sigma(\Delta 1P*\Delta 2P)}{\Sigma(\Delta 2P^2)*\Sigma(\Delta 1P^2) - \Sigma(\Delta 1P*\Delta 2P)*\Sigma(\Delta 1P*\Delta 2P)}$$

Although these equations appear somewhat formidable there are only 5 accumulated terms to compute each of which is the product of simple multiplications of differences i.e. the number of computations scales linearly with the number of pixels processed. This thus provides a common scale factor and common offset that if applied to the 1pt table corrects for the unwanted variation in output between individual elements in the array.

The values for M and C may be calculated over a number of images e.g. by processing a band of pixels for each successive frame. This can reduce the processing load compared with complete recalculation and is possible since the degradation of the image due to required updating of the factors in the 1pt table occurs sufficiently slowly to allow updates to be applied at a rate much below the frame rate of the camera.

Whilst the constants M and C are global, in practice it is best to only consider those adjacent pixel pairs having the smallest differences in the output image. The closest matching adjacent pixel pairs can be selected by maintaining a threshold difference value. Adjacent pixel pairs having a difference above the threshold value are eliminated from the calculation of M and C. The threshold can be preset at a particular value or can be incremented up or down as required. Typically, the threshold might be adjustable such that a particular desired percentage, say 50%, of the adjacent pixel pairs have a difference below the threshold. Using the closest matching adjacent pixel pairs has the benefit of decreasing the likelihood that the difference between adjacent pixels is due to actual image features.

Whilst the updated linear transformation can be applied to the values in the 1pt table permanently i.e. by altering and storing the altered values as a new 1pt table, it is sometimes more convenient to maintain the original table and calculate new adjusted values on the fly.

This is schematically illustrated in the flow diagram of FIG. 2. Herein, the first step 301 is the capture of an initial raw image. Using the threshold method described above a selection of adjacent pixel pairs are chosen at step 302 from the current displayed image and these selected pixel pairs are then used at step 303 to calculate the values of C and M to be used in the next cycle. The method now proceeds to step 304 wherein the C and M corrections are applied to the 1pt table and the modified 1pt (including the C and M values) and 2pt corrections are applied to the raw image to generate at step 305 a corrected image. The method then loops back to step 301 wherein the process is repeated.

A further improvement in this correction can be achieved by correcting for variation in brightness in the corrected image from frame to frame as a result of the variation in M and C. This can be achieved by setting the initial value of M to 1 and calculating the required initial value of offset C such that the overall average of all the individual factors in the 1pt table is 0. In such circumstances, if C is added back to the corrected output, after the correction calculations detailed above, the corrected output is given by:

$$O_{Ni,j}=(O_{Ri,j}-M*1pt_{i,j}-C)*2pt_{i,j}+C$$

Importantly, in such circumstances variation in the values of M or C will not change the overall mean value of the corrected array outputs. This is because, the average value of 1pt table is 0 and the average value of the 2pt table is 1. Whilst this is not required to fix the non-uniformity in the image it does prevent the image brightness appearing to change with each new calculated value of M and C.

As with the previous implementation this method has the benefit that it can be implemented on a camera without the need for a shutter or the need for a Peltier device to maintain the temperature of the array or a thermistor to monitor the temperature of the array. Accordingly, the camera can comprise fewer components meaning that it is lighter, consumes less power and is cheaper to manufacture. Additionally, the omission of the shutter reduces the number of moving parts thus enhancing the potential lifespan. A further benefit is that the array and the processing unit may be provided on a single integrated circuit, thus further reducing cost of manufacture.

In practical embodiments however, the shutter may be retained so as to provide a simple way to generate new 1pt tables periodically. Given the method of the present invention however, the time interval between successive uses of the shutter can be extended markedly as compared with the prior art.

The main reason for variation in the 1pt table factors is that the array has changed temperature. One way to deal with this variation is to create and store a plurality of 1pt tables (effectively shutter images) across the range of operating temperatures during calibration. The 1pt table closest to the operating temperature can then be selected as the basis for correction. The table can be selected by monitoring the temperature of the array or by calculating the 1 pt table that minimises the sum of the square of the differences in corrected output between selected adjacent pixel pairs in the array. Further adjustments may then be made in accordance with the implementation described above to fine tune adjustments to the table to achieve an acceptable image quality.

If a plurality of 1pt tables are available, once there is a swap between one 1pt table and another, as the array temperature changes, there will be a change in image quality which will take some time to settle. This is particularly the case when the threshold is used in the selection of suitable adjacent pixel pairs as the selection of adjacent pixel pairs will vary which in turn alters the quality of the image. This is not acceptable if it can be readily observed in the corrected image.

This problem is solved by calculating C and M for both the currently suitable 1pt table and one or more closely related tables simultaneously. The selected 1pt table and C and M values can then be swapped simultaneously so that the quality of the image remains optimal. The criteria for switching tables may be based on the measured temperature of the array. Additionally or alternatively, the criteria may be based on selecting the 1pt table that has the smallest sum of the squares of the differences between adjacent pixel pairs (the $D^2$ term that appears in the derivation). In either case a hysteresis factor is employed to prevent repeated switching between 1pt tables in boundary regions.

Whilst this solves the above problem it does so at the expense of an increased processing load. However, as has been explained above, many of the aspects of this implementation permit a reduction in the processing load so the overall processing load may still be less than that provided for in the prior art.

An alternative approach, which can avoid the above problem, is to extend the number of different tables of correction factors used simultaneously in the matching process. Indeed if the number of tables matches the actual number of linear scalar parameters affecting the physical output of the pixel system, then only this number of tables is required to correct the output of the camera under all conditions. For example, the electrical resistance of each individual pixel might be one physical variable contributing to the array non-uniformity, however, the electrical readout circuitry might also introduce gain and offset (effectively two additional parameters) per pixel. In such a system only three tables are required to correct for non-uniformity under all conditions. A general derivation of this method is illustrated in outline below In the following, let: i be the corrected pixel output value; p the raw pixel output value; $t_1, t_2, t_3, \ldots$ the correction tables; and $f_1, f_2, f_3, \ldots$ are the common correction parameters (in this example scale factors) to be applied to the values of the respective correction tables. Furthermore, let the addition of a ' signify that a parameter or variable relates to an adjacent pixel. Then $$i=p-f_1*t_1-f_2*t_2-f_3*t_3-\ldots$$

and $$i'=p'-f_1*t_1'-f_2*t_2'-f_3*t_3'-\ldots$$

The difference between the corrected outputs of adjacent pixels is:

$$i-i'=(p-p')-f_1*(t_1-t_1')-f_2*(t_2-t_2')-f_3*(t_3-t_3')-\ldots$$

As in the previous approach, the invention involves calculating the appropriate scale factors to minimise the sum of the square of the difference in corrected outputs between adjacent pixels, i.e. Minimise:

$$\Sigma((p-p')-f_1*(t_1-t_1')-f_2*(t_2-t_2')-f_3*(t_3-t_3')-\ldots)^2$$

Substituting the terms below:

$$P=(p-p'); T_1=(t_1-t_1'); T_2=(t_2-t_2'); T_3=(t_3-t_3'); \ldots$$

The sum for minimisation can be written $$\Sigma P^2 + f_1^2 * \Sigma T_1 * T_1 + f_2^2 * \Sigma T_2 * T_2 - 2 * f_2 * \Sigma T_2 * P + 2 * f_1 * f_2 * \Sigma T_1 * T_2 \ldots$$

To solve for each individual scale factor ($f_1, f_2, f_3, \ldots$) requires the above to be differentiated with respect to each scale factor ($f_1, f_2, f_3, \ldots$) and the resultant differentiated sums set to zero. For example, differentiation by $f_1$ gives:

$$0 = 2*f_1*\Sigma T_1*T_1 - 2*\Sigma T_1*P + 2*f_2*\Sigma T_1*T_2 \ldots$$

This can be rearranged:

$$\Sigma T_1*P = f_1*\Sigma T_1*T_1 + f_2*\Sigma T_1*T_2 \ldots$$

Repeating the above for each scale factor ($f_1, f_2, f_3, \ldots$) in turn provide an extra linear equation for each factor:

$$\Sigma T_1*P = f_1*\Sigma T_1*T_1 + f_2*\Sigma T_1*T_2 \ldots;$$

$$\Sigma T_2*P = f_1*\Sigma T_2*T_2 + f_2*\Sigma T_2*T_1 \ldots; \text{etc}$$

Accordingly a set of simultaneous linear equations that can be analytically solved for each scale factor ($f_1, f_2, f_3, \ldots$) is obtained. This approach can be extended to cover as many tables (and associated scalar correction parameters) as are required.

In order to implement this approach practically, a number of multiplications have to be performed for each pixel. The results of the multiplications are summed and substituted into the simultaneous equations referred to above. The simultaneous equations can then be solved to determine the factors. This approach lends itself to straightforward implementation in electronics i.e. as DSP code, FPGA blocks or in a dedicated ASIC.

The disadvantage of adding extra tables is that the number of summed multiplications increases. For N tables the number of summed multiplications is (N+3)*N/2. For four tables there are therefore fourteen summed multiplication terms. Furthermore, if this is applied to a threshold selection of pixel pairs having minimum variation therebetween, since the threshold selection may vary from frame to frame, strictly none of the summed multiplications can be pre-computed.

This can be overcome if an iterative solution is tolerable, which it generally is. In such cases, the values for the raw pixel pairs that are rejected (over the threshold) can be replaced with values predicted from the current scalar factors. In practice this can be achieved by substituting the current 1pt values for the raw values of the rejected pixels. With this substitution the computation can include all pixels, every time, which means that all the cross table products can be pre-computed. This simplification reduces the number of summed multiplications required to N. The consequence is that the calculation doesn't find the optimum value each time but does converge to it. This is satisfactory during normal ongoing operation. To improve initial performance on start up, the threshold can be held arbitrarily large so that all pixels are included in the calculation whereupon the result is exact for that cycle.

It is of course to be understood that the invention is not to be restricted to the details of the above embodiments which have been described by way of example only.

The invention claimed is:

1. A method of automatically calculating one or more common correction parameters for a set of individual correction parameters for sensor elements in a sensor array operable to capture an image by determining the one or more common correction parameters that when applied the individual correction parameters for each sensor element in the sensor array before they are used to correct the output of the sensor elements will minimise the differences between the corrected outputs of adjacent sensor elements in the array, where the common correction parameters are determined by automatically calculating the common correction parameters that will minimise the sum of the squares of the differences between the corrected outputs of adjacent sensor elements.

2. The method of claim 1, further comprising: applying a correction to each element in the array, the correction comprising a one or more common correction parameters applied in the same manner to each of to a set of pre-determined individual correction parameters, wherein the one or more common correction parameters are calculated according to the method of claim 1.

3. The method of claim 1, wherein the sets of individual correction parameters include either or both of an individual correction offset and an individual correction scale factor.

4. The method of claim 1, wherein the common correction parameters applied to each individual correction parameter comprise either: a single scale factor; an offset; or a compound common correction comprising both a scale factor and an offset.

5. The method as claimed in claim 4, wherein in the event that common correction parameters comprise both a scale factor and an offset, the scale factor and offset are independently calculated from the same output map of the array by the following steps: a scale factor is calculated and then the data corrected by the use of the scale factor is used to calculate an offset; or an offset is calculated and then the data corrected by the use of the offset is used to calculate a scale factor.

6. The method of claim 1, wherein the sum of the squares of the differences in corrected output of adjacent sensor element pairs is calculated over the whole array or over a selection of particular adjacent sensor element pairs wherein the selection is based on location or is based on a particular threshold so as to only take into consideration adjacent sensor element pairs with the lowest differences in output.

7. The method of claim 6, wherein the threshold is a preset value or wherein the threshold is varied so as to exclude a particular proportion of adjacent sensor element pairs.

8. The method of claim 1, wherein the set of stored individual correction parameters comprises one or more set of offset parameters calculated by imposing a uniform input to the sensor array, wherein if there are two or more sets of stored individual correction parameters, these are calculated at different array temperatures and wherein the temperatures chosen span substantially the full operating range of the sensor array.

9. The method of claim 8, wherein in the event of operation at a temperature which differs from the temperatures at which the stored individual correction parameters are calculated, the method involves the interpolation, linear or otherwise, of one set of stored individual correction parameters calculated at a first temperature to the operation temperature.

10. The method of claim 1 wherein the method operates substantially continuously to optimise the one or more common correction parameters by using an uncorrected and/or a corrected array output as a basis for calculating the one or more common correction parameters for applying to the individual correction parameters in a subsequent array output correction.

11. The method of claim 10, wherein the common correction parameters for application in a subsequent correction are calculated over a succession of prior outputs, wherein each prior output considers either summed differences over the array as a whole or summed differences over a particular section of the array and wherein different sections are used in turn until the whole array output has been considered over a number of output cycles.

12. The method of claim 1, wherein in the event that the individual correction parameters comprise individual correction offsets, the individual correction parameters are adapted such that the average value of the individual correction offsets over the whole array, when the common correction parameters are applied, is substantially zero.

13. The method of claim 8, wherein the method involves calculating scalar parameters for alternative sets of individual correction parameters calculated at different array temperatures in accordance with the method of claim 8 and then selecting the better set of individual correction parameters (and common correction parameter) to use for array output correction.

14. The method of claim 1, wherein the better set of individual correction parameters (and common correction parameter) for use is selected by determining which set of individual correction parameters (and common correction parameter) has the lower sum of the square of differences between adjacent sensor element pairs.

15. The method of claim 14, wherein the sum of the squares of the differences in corrected output of adjacent sensor element pairs is calculated either over the whole array or over a selection of particular adjacent sensor element pairs and wherein the selection is based on location or is based on a particular threshold so as to only take into consideration adjacent sensor element pairs with the lowest differences in output.

16. The method of claim 14, wherein the method may include a hysteresis factor in determining whether to switch between sets of individual correction parameters.

17. The method of claim 1, wherein the method involves using more than two sets of individual correction parameters, each set of correction parameters being provided with one or more common correction parameters.

18. The method of claim 17, wherein in the event that adjacent sensor element pairs are selected by means of a threshold for calculating the common correction parameter that will minimise the sum of the squares of the differences in corrected outputs between adjacent sensor element pairs, the values of the outputs from rejected sensor element pairs are substituted by the current respective values of the individual correction parameters with the current common correction parameters applied and wherein upon initial start up the threshold is held arbitrarily large so that all sensor elements are included in the calculation.

19. An apparatus comprising:
a sensor array having a plurality of sensor elements; and
a processing unit connected thereto, wherein the processing unit is operable calculate one or more common correction parameters for a set of individual correction parameters for sensor elements in the sensor array operable to capture an image by determining the one or more common correction parameters that when applied the individual correction parameters for each sensor element in the sensor array before they are used to correct the output of the sensor elements will minimise the differences between the corrected outputs of adjacent sensor elements in the array, where the common correction parameters are determined by calculating the common correction parameters that will minimise the sum of the squares of the differences between the corrected outputs of adjacent sensor elements.

20. The apparatus of claim 19, wherein the array is an array of infrared radiation sensing elements.

21. The apparatus of claim 19, wherein the sensor array is provided on a single integrated circuit and wherein the processing unit is provided on the same integrated circuit as the sensing array or is provided on a separate integrated circuit to the sensing array.

22. The apparatus of claims 19, wherein the processing unit is a digital signal processor (DSP), field-programmable gate array (FPGA) block or a dedicated application specific integrated circuit (ASIC).

23. The apparatus of claim 19, wherein the sensor array is configured and arranged to detect infrared radiation through an infrared camera.

24. The apparatus of claim 19, wherein the sensor array is configured and arranged to detect electromagnetic radiation through a radiometer.

* * * * *